United States Patent [19]
Laverick

[11] Patent Number: 6,101,726
[45] Date of Patent: Aug. 15, 2000

[54] SAW BLADE CLAMP

[75] Inventor: Ray Laverick, Bishop Auckland, United Kingdom

[73] Assignee: Black & Decker Inc., Newark, Del.

[21] Appl. No.: 08/807,731

[22] Filed: Feb. 27, 1997

[30] Foreign Application Priority Data

Mar. 1, 1996 [GB] United Kingdom .................... 9604463

[51] Int. Cl.$^7$ ........................... B23D 51/10; B27B 19/02; B27B 19/09
[52] U.S. Cl. ................................. 30/392; 30/338; 279/30; 279/79
[58] Field of Search ..................................... 30/392, 272.1, 30/277.4, 329, 337, 338, 339; 279/79, 29, 30

[56] References Cited

U.S. PATENT DOCUMENTS

| | | |
|---|---|---|
| 1,181,383 | 5/1916 | Haeseler . |
| 2,580,930 | 1/1952 | Kost . |
| 3,823,473 | 7/1974 | Hoffman .................................. 30/338 |
| 3,901,117 | 8/1975 | Hoffman .................................. 30/392 |
| 4,174,648 | 11/1979 | Wallis . |
| 4,285,129 | 8/1981 | Hoffman .................................. 30/392 |
| 4,294,013 | 10/1981 | Krieg ........................................ 30/392 |
| 4,339,976 | 7/1982 | Wallis . |
| 4,377,100 | 3/1983 | Wallis . |
| 4,528,753 | 7/1985 | Kuhlmann et al. . |
| 4,601,477 | 7/1986 | Barrett et al. . |
| 4,648,182 | 3/1987 | Hoffman .................................. 30/392 |
| 4,831,693 | 5/1989 | Veith et al. . |
| 4,956,899 | 9/1990 | Green . |
| 5,183,236 | 2/1993 | Droulon . |
| 5,306,025 | 4/1994 | Langhoff . |
| 5,322,302 | 6/1994 | Quirijnen ................................. 279/22 |
| 5,324,052 | 6/1994 | Ortmann .................................. 30/339 |
| 5,647,133 | 7/1997 | Dassoulas ................................ 30/392 |

FOREIGN PATENT DOCUMENTS

| | | |
|---|---|---|
| 0582326 | 2/1994 | European Pat. Off. . |
| 0587498 | 3/1994 | European Pat. Off. . |
| 4313718 | 11/1994 | European Pat. Off. . |
| 0719610 | 3/1996 | European Pat. Off. . |
| 2695344 | 3/1994 | France . |
| 3030855 | 9/1981 | Germany . |
| 3622761 | 1/1988 | Germany . |
| 9318616 | 2/1994 | Germany . |
| 9305915 | 4/1993 | WIPO . |

Primary Examiner—Hwei-Siu Payer
Attorney, Agent, or Firm—Bruce S. Shapiro; John D. Del Ponti

[57] ABSTRACT

A saw blade clamp (1) comprises a body (3) defining a channel (13) for a saw blade (11), a retaining member (17), biasing means (19) for continuously urging the retaining member (17) towards the channel (13) to abut a saw blade (11) in use in the channel (13), and a release device (30) separate from the retaining member (17) and the biasing means (19). When activated the release device (30) acts on the retaining member (17) to move the retaining member (17) away from the channel (13) to allow a saw blade (11) to be entered into or removed from the channel (13).

11 Claims, 1 Drawing Sheet

SAW BLADE CLAMP

This invention relates to saw blade clamps, and in particular to a saw blade clamp for a jigsaw or the like.

Jigsaws comprise a housing accommodating a motor for driving a reciprocating shaft which carries a saw blade clamp. When mounted in the saw blade clamp, a saw blade, which is usually long, thin and flat, extends below the housing of the jigsaw to cut workpieces. One such jigsaw clamp comprises a channel for receiving a saw blade, a coil spring, and a pin carried on the coil spring, the pin being biased by the coil spring towards the saw blade. The arrangement is such that, in use, the saw blade is retained in the channel by the pin by virtue of the biasing action of the spring on the pin. A free end of the spring serves as a release device. To remove the saw blade, a force acting against the torsion of the spring is applied to the free end of the spring, and the pin thereby moves away from and frees the saw blade. With such a clamp, therefore, it is necessary to subject a free end of the spring to stress in order to remove a saw blade. This is clearly undesirable. Hence, the present invention provides a clamp which aims to improve upon the known prior art.

According to the present invention, there is provided a saw blade clamp comprising a clamping device for retaining, in use, a saw blade in the clamp, and a release device which does not form part of the clamping device, wherein the release device is pivotably mounted and manually operable so that rotation of the release device about its pivot axis results in release of the clamping device. Preferably, the clamping device comprises a retaining member and biasing means for continuously biasing the retaining member towards, in use, a saw blade retained in the clamp.

Also according to the present invention there is provided a saw blade clamp comprising a body defining a channel for a saw blade, a retaining member, biasing means for continuously urging the retaining member towards the channel to abut a saw blade in use in the channel, and a release device separate from the retaining member and the biasing means which when activated acts on the retaining member to move the retaining member away from the channel to allow a saw blade to be entered into or removed from the channel. Preferably, the release device is pivotably attached to the body.

In a preferred embodiment of the invention, the release device includes an aperture for receiving a portion of the retaining member. Preferably, the aperture is elongate so as to allow movement of the retaining member within the aperture.

In a preferred embodiment, the release device has a substantially U-shaped cross section, each leg of the U engaging the retaining member during use. Preferably, the release device is attached to opposite surfaces of the body adjacent ends of the U.

The release device may be provided with a colour which is distinguishable from the colour of the body.

Preferably the retaining member is a pin and the biasing means comprises two springs which are located on opposite ends of the pin.

As mentioned above, a clamp according to the present invention is particularly suitable for use with a jigsaw, the clamp simply being screwed or otherwise attached to a reciprocating shaft of the jigsaw.

A specific embodiment of the present invention is now described, by way of example only, with reference to the accompanying drawings, in which.

Figure 1:
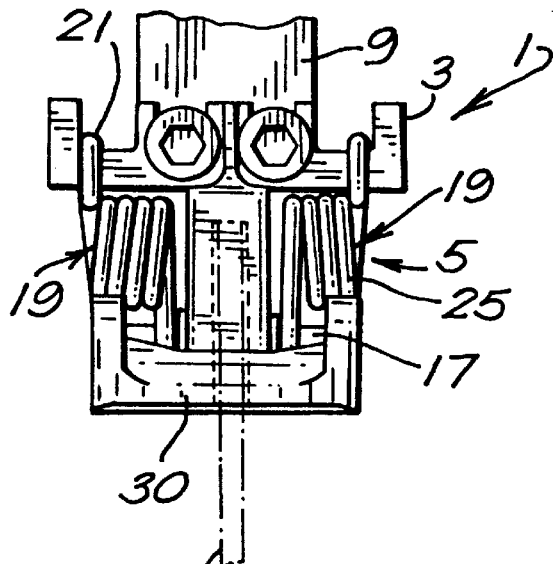
FIG. 1 is a front view of a saw blade clamp according to the present invention.

With reference to the drawings, a saw blade clamp 1 according to the present invention comprises a body 3 and a releasable clamping device 5. The saw blade clamp 1 is shown in the drawings mounted to a reciprocating shaft 9 of a jigsaw (not shown). The saw blade 11 used for cutting workpieces is held in the clamp 1 by means of the releasable clamping device 5.

Figure 3:
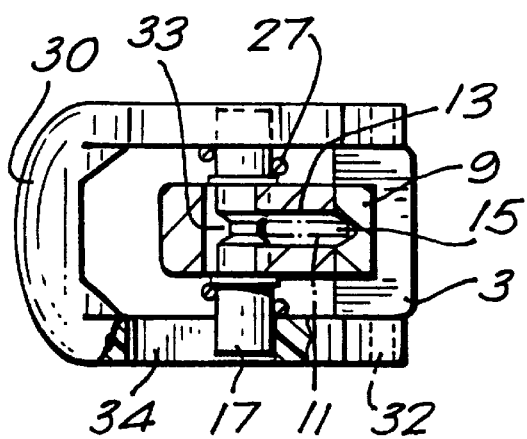
FIG. 3 is a section on the line A—A of FIG. 2.

The body 3 has a substantially T-shaped cross section, as shown in FIG. 3. Three sides of a channel 13 are defined in the top of the T, the fourth side of the channel 13 being closed by the reciprocating shaft 9. As can be seen in FIG. 3, the reciprocating shaft 9 includes a V-shaped longitudinal groove 15 which receives an edge of the saw blade 11 to assist in correctly aligning the saw blade 11 for cutting.

The side of the channel 13 opposite to the V-shaped groove 15 is partially open to allow access to the saw blade 11 within the channel 13. Hence, a roller or pin 17 forming part of the releasable clamping device 5 can contact an edge of the saw blade 11. The pin 17 is carried by two torsion springs 19 which are mounted on either side of the channel 13, as shown in FIG. 1. Each of the torsion springs 19 includes (i) a hooked end 21 engaging a seat 23 forming part of the body 3, (ii) a first helical portion 25 in torsion and (iii) a second helical portion 27 surrounding an end of the pin 17.

The releasable clamping device 5 also includes a substantially U-shaped cross section release device 30. The release device is pivotably connected adjacent ends of the U to opposite surfaces of the body 3, one of which pivots is shown at 32. Each projection on the U comprises an elongate aperture 34 which slidably receives an end of the pin 17. The release device is provided with a colour which is easily distinguishable from the body of the clamping device, so that the device can be readily identified by a user of the jigsaw.

Figure 2:
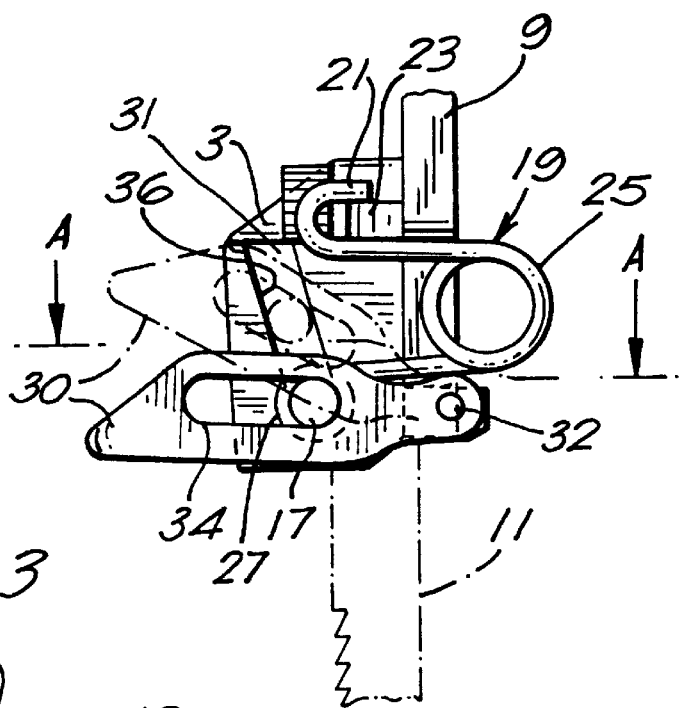
FIG. 2 is a side view of the saw blade clamp of FIG. 1.

As can be seen in FIG. 2, the pin 17 is arranged to travel in a track 31 formed in the leg of the T-shaped body 3. The track 31 is provided with an external layer 36 formed of a material which facilitates movement of the pin in the track. Hence, if the release device 30, which forms a lever, is pivoted upwards about the pivot 32, the pin 17 is moved away from the saw blade 11, thereby releasing the saw blade 11. Withdrawal of the saw blade 11 can then be effected. Conversely, when the release device is released, the torsion springs 19 urge the pin 17 or downwards towards the channel 13 and into contact with the saw blade 11. Clamping or gripping of the saw blade 11 between the pin 17 and the reciprocating shaft 9 is thereby achieved to prevent removal of the saw blade 11 during use of the jigsaw.

As can be seen in FIG. 3, the pin 17 is provided with a circumferential groove 33 which receives the saw blade 11 to assist in aligning the saw blade 11 for cutting. Further, as a result of being cylindrical, the pin can roll along the edge of the saw blade 11 during clamping or release of the saw blade.

It will be appreciated that a force exerted on the release device 30 is transferred directly to the pin 17 by virtue of the aperture in the release device.

It will be appreciated that the clamping device could comprise a single spring, instead of two springs.

It will of course be understood that the present invention has been described above purely by way of example, and that modifications of detail can be made within the scope of the invention.

What is claimed is:

1. A saw blade clamp comprising:

a body defining a channel for a saw blade;

a retaining member;

biasing means for continuously urging the retaining member towards the channel to abut a saw blade in use in the channel; and a release device distinct from the retaining member and the biasing means, and said release device including a means for holding a portion of the retaining member in said release device such that when activated, said release device acts on the retaining member to move the retaining member away from the channel to allow a saw blade to be entered into or removed from the channel.

2. A clamp as claimed in claim 1, wherein the release device is pivotably attached to the body.

3. A clamp as claimed in claim 1, wherein the release device receiving means includes an aperture for receiving a portion of the retaining member.

4. A clamp as claimed in claim 3, wherein the aperture is elongate so as to allow movement of the retaining member within the aperture.

5. A clamp as claimed in claim 1, wherein the release device has a substantially U-shaped cross-section, each leg of the U engaging the retaining member during use.

6. A clamp as claimed in claim 5, wherein the release device is attached to opposite surfaces of the body adjacent ends of the U.

7. A clamp as claimed in claim 1, wherein the release device is provided with a color which is distinguishable from the color of the body.

8. A clamp as claimed in claim 1, wherein the retaining member is a pin.

9. A clamp as claimed in claim 1, wherein the biasing means comprises two springs which are located on opposite ends of the retaining member.

10. A saw blade clamp comprising:

a clamping device for retaining a saw blade in the clamp;

a release device which does not form part of the clamping device, wherein the release device holds a portion of the clamping device and is pivotably mounted and manually operable such that rotation of the release device about its pivot axis results in release of the clamping device; and said clamping device comprising a retaining member and biasing means for continuously biasing the retaining member towards a saw blade retained in the clamp.

11. A jigsaw comprising a reciprocating shaft and a saw blade clamp mounted on the shaft, said clamp comprising:

a clamping device for retaining a saw blade in the clamp;

a release device which does not form part of the clamping device, wherein the release device holds a portion of the clamping device and is pivotably mounted and manually operable such that rotation of the release device about its pivot axis results in release of the clamping device; and said clamping device comprising a retaining member and biasing means for continuously biasing the retaining member towards a saw blade retained in the clamp.

* * * * *